(12) United States Patent
Sigl, Sr.

(10) Patent No.: US 10,831,531 B1
(45) Date of Patent: *Nov. 10, 2020

(54) SYSTEMS, DEVICES, AND METHODS FOR MAINFRAME DATA MANAGEMENT

(71) Applicant: United Services Automobile Association (USAA), San Antonio, TX (US)

(72) Inventor: William Francis Sigl, Sr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,347

(22) Filed: Oct. 11, 2019

Related U.S. Application Data

(63) Continuation of application No. 16/231,084, filed on Dec. 21, 2018, now Pat. No. 10,521,266, which is a continuation of application No. 15/823,293, filed on Nov. 27, 2017, now Pat. No. 10,169,077.

(60) Provisional application No. 62/427,085, filed on Nov. 28, 2016.

(51) Int. Cl.
*G06F 9/48* (2006.01)
*G06F 21/62* (2013.01)
*G06F 9/451* (2018.01)
*G06F 16/2455* (2019.01)

(52) U.S. Cl.
CPC ............ *G06F 9/4843* (2013.01); *G06F 9/451* (2018.02); *G06F 16/2455* (2019.01); *G06F 21/62* (2013.01)

(58) Field of Classification Search
None
See application file for complete search history.

(56) References Cited

U.S. PATENT DOCUMENTS

| | | |
|---|---|---|
| 2010/0205475 A1 | 8/2010 | Ebrahimi et al. |
| 2010/0306682 A1 | 12/2010 | Williamson |
| 2015/0269194 A1 | 9/2015 | King et al. |

*Primary Examiner* — Craig C Dorais
(74) *Attorney, Agent, or Firm* — Fletcher Yoder, P.C.

(57) ABSTRACT

Utility programs run on multiple mainframes to periodically monitor a list of started tasks that have been defined in metadata files as running on each mainframe. Some of the utility programs is largely driven by metadata, and filters programmed to manage an output stream for each started task, as the output stream is generated, while remaining agnostic as to an origin of the output stream. When problems are detected in the output stream, users are notified via alerts, along with a suggestion of what to do. This batch dashboard application can be used by anyone with mainframe started tasks that need to be monitored. Once alerted to a problem, the users can logon to the online dashboard for that same list of started tasks and take actions to research and fix the problems.

20 Claims, 28 Drawing Sheets

```
--------------- EOS Security Maintenance Tool - Main Menu ---------------
Option ===>

(A) Form Groups (B) Users
```

FIG. 3A

```
--------------- EOS SECURITY-FORM GROUPS                    ---------------
Command ===>                                              Scroll : CSR Prim Cmds - VJOB=View JOB File   VLOG=View Log File   VMIG=View Mgrtn Log File
            FG=FORM GROUPS       FR=FORM RSTRCTD ACTIONS   UF=USER FORM GROUP Session ID    >  _____
Environment   >  _____
```

FIG. 3B

```
------------------------- Form Group Maintenance -------- Row 1 to 4 of 4
Command ===>                                                   Scroll: CSR Prim Cmds - F5=Process      USRS=View Form Grp Users    I=Insert x lines
            ADD=ADD FormGroup   UPD=Update FormGroup    DEL=Delete FormGrp Session ID      : PROD
Environment     : ENCRPT
Form Group      > ?
Type (INC/EXC): INC Enter form ids
```

FIG. 4A

```
------------------------- Selection List --------------- Row 1 to 4 of 4
Command ===>                                                   Scroll: CSR
  FORM GROUP Primary Cmds - SORT=SORT DATA
Line Cmds    - S=SELECT Line  (1)                              (2)
Cmd   Value                            Description
      $NEWEMP                          NEW EMPLOYEES (limited)
      $PRODALL                         ALL FORMS (auditors)
      $PRODEXC
   s  $PRODTZ                          All reports in TZ subsys
```

FIG. 4B

```
------------------------- Form Group Maintenance -------- Row 1 to 4 of 4
Command ===>                                                   Scroll: CSR Prim Cmds - F5=Process      USRS=View Form Grp Users    I=Insert x lines
            ADD=ADD FormGroup   UPD=Update FormGroup    DEL=Delete FormGroup Session ID      : PROD
Environment     : ENCRPT
Form Group      > $PRODTZ
Type (INC/EXC): INC Enter form ids
  TZ..
```

FIG. 4C

```
------------------- Form Group Users ------------ Row 1 to 1 of 1
Command ===>                                      Scroll: CSR Prim Cmds - F3=Return      F xxxxxx=Find a userid in the list Session ID    : PROD
Environment   : ENCRPT
Form Group    : $PRODTZ    :
Nbr of Users  : 6

Users of this Form group
  -------  -------  -------  -------  -------  -------   -------
-------
: $ADMINS  AUDITRS  TZCT910  TZFR422  YZ98CV8  ZZ54TA1
```

FIG. 4D

```
/********************************************************************/
/* Log of EOSSEC   activity                                         */
/********************************************************************/
$ADMINS  2016/05/13  8:55am       SUB JUT75085 ADD FRMGRP:$PROD
$ADMINS  2016/05/13  8:55am        -  (CONT)    TO ADD FORMS:
$ADMINS  2016/05/17  7:18am       SUB JUT74895 UPD FRMGRP:$PROD
$ADMINS  2016/05/17  7:18am        -  (CONT)    TO ADD FORMS:
$ADMINS  2016/05/17  7:31am       SUB JUT3687  UPD FRMGRP FROM
$ADMINS  2016/05/18  9:48am       SUB JUT41004 UPD FRMGRP FROM
$ADMINS  2016/05/19  7:06am       SUB JUT24487 UPD FRMGRP FROM
```

FIG. 4E

```
------------------ Form Group Assignment ---------- Row 1 to 2 of 900
Command ===>                                                Scroll: CSR Prim Cmds - F5=Process     F xxxxxx=Find a userid in the list
            S*=Select All  U*=UnSelect All  SORT=Sort Data
            REF=Refresh Dsply
Line Cmds - S =Select      U =UnSelect Session ID   : WSFPVENC
Environment  : 2016E Line  (1)       (2)                      (3)        (4)        (5)
Cmd   UserId    Name                     FormGroup  UserGrp    AuthProf
----  --------  ----------------------   ---------  ---------  ---------
 _    TZCT910   I.M. PENNEYLESS          $PRODTZ    @PRDSUPR   #TZUSERS
 _    ZZ54TA1   BILLY CLUBB              $PRODTZ    @JUSTAGY   #NOPRINT
```

Fig. 5A

```
------------------ Excluded Actions for FormIds -- Row 1 to 27 of 4,632
Command ===>                                                Scroll : CSR Prim Cmds - VLOG=View Log    F xxxxxx=Find a FormId in the list
            REF=Refresh Dsply  SORT=Sort Dsply by columns    F5=Process Session ID   : WSFPVENC
Environment  : 2017E (1)    (2)   (3)   (4)                (5)
 FormId Prnt  Xport Report ID          Report Name
 ------ ----  ----- -----------------  -----------------------
 ELFS          X    FINDX_SYNC_ERR     FINDX SYNC ERRORS
 ELEL   L           EOS SP & RI INF    SPOOL, RINDX, & FINDX INFO
 ELSR          X    SP & RI DETAIL     SPOOL & RINDX DETAIL
 AE01               AE-IMTYPESC        DEMAND DEPOSITS BY TYPE (REACT)
 AE02               AE-IMFUNDS3        DEMAND DEPOSITS (NEWLY FUNDED)
 AE03               AE-IMACHALL01      ACH ACTIVITY SUMMARY-ACCT TYPE
 AE04               AE-IMACHALL02      ACH ACTIVITY (CREDIT) PER TRNCDE
 AE05               AE-IMACHALL03      ACH ACTIVITY (DEBIT) PER TRNCDE
 AE06               AE-IMBEXAR01       INTERNAL DEPOSIT BY ACCOUNT TYPE
 AE07               AE-ATMDBTRN        ATM/DEBIT TRANS DETAIL TRNCDE
 AE08               AE-STREXAR         TIME DEPOSITS SEPARATING CLOSED
```

```
------------------------------ Select Components To Be Worked ---- Row 1 to 4 of 4
Command ===>                                                           Scroll: CSR Prim Cmds -  S*=Select All     VLOG=View Log File   F xxxx=Find line
             U*=Unselect All   F5=Process
Line Cmds -  S=Select          U=Unselect   V=View Src Session ID       : WSFPVENC
Environment      : 2016E Conversion Typ ) ELJCLVL JCL  USAAP.ELMAINT.JCLLIB_____
Inpput DSN     ) 'USAAP.ELMAINT.JCLLIB'_____
Output DSN     ) 'ELP.ELMAINT.RPT81647'_____

Line
 Cmd    MEMBER
 ----   ------
  _     ADHOCEM
  _     ADHOCEMB
  _     ADHOCEMC
  _     ADHOCEM1
  _     ADHOCEM2
```

FIG. 10B

```
ELBDTCHK ------------------------ BDate Table Validation ------------------------
Command ===>                                                          Scroll : CSR Prim Cmds - VLOG=View Log File     F5=Process Session ID       : WSFPVENC
Environment      : 2016E
Bdate DSN        : 'EL.SHARE.BDATE.TABLE.ENCRYPT.WORK'

Formid DSN     ) 'EL.SHARE.BKEE.FORMID.LIST'_____
Output DSN     ) 'EL.ELMAINT.RPT73314'_____
```

FIG. 10C

```
ELCONV ------------- Select Components To Be Worked -----------------
Command ===>                                                Scroll : CSR Prim Cmds - S*=Select All     VLOG=View Log File   F xxxx=Find this line
            U*=Unselect All   F5=Process
Line Cmds - S=Select          U=Unselect  V=View Src Session ID     : WSFPVENC
Environment    : 2016E Conversion Typ >  ?
Inpput DSN     >
Output DSN     > 'EL.ELMAINT.RPT02606'

Line
Cmd    MEMBER
```

FIG. 10D

```
-------------------- Selection List --------------- Row 1 to 4 of 4
Command ===>                                                 Scroll: CSR Inpput DSN     > 'USAAP.ELMAINT.JCLLIB'
Output DSN     > 'ELP.ELMAINT.RPT81647'

ALLOWABLE TYPES OF CONVERSIONS

Primary Cmds - SORT=SORT DATA
Line Cmds    - S=SELECT

Line   (1)                                  (2)
Cmd    Value                                Description
---
  _    USAAP.CASH.JCL(JEL*)                 ELENCJCL **JCL ** BANK JCL
  _    TZ93K6Z.PRIVATE.CSV                  ELBKMDLJ **CSV ** GEN MDL
  _    USAAP.ELMAINT.JCLLIB(FTP*)           ELCNVFTP **JCL ** CONVERT
  _    USAAP.TENC.MODELS(FTP*)              ELCFTPUS **JCL ** CONVERT
```

FIG. 10E

```
------------------------- VALIDATE COMPONENTS ------------------------------
Command ===>                                                    Scroll: CSR Prim Cmds - VJOB=View JOB File  VLOG=View Log File   VMIG=Vw Mgrtn Log
            JCL_VL      PPE=SYNC FINDX FOR PPE    CONV    DR_DSN  BDATE
            PACKS       CPYAMI      FIDC       FIFIX Session ID    ) WSFPVENC
Environment   ) 2016E__

Esssssssssssssssssssssssssssssssssssssssssssssssssssssssssssssssssssssss
e ELCPYAMI INFO: 5921 Archive Files have been Copied. 53 members were
e created in TZ93K62.CPYAMI.JCL11045
e
Dsssssssssssssssssssssssssssssssssssssssssssssssssssssssssssssssssssssss
```

FIG. 10F

```
---------------------- Disk Pack Selection --------------Row 1 to 6 of 6
Command ===>                                                  Scroll: CSR Prim Cmds - F5=Process   VJOB=Log Of Jobs   VMIG=Migrtn Log   VLOG=Vw Log Select space you want for)  _____

Replicated DASD Ind      ) Y
Cnfig Cyls / Pack Needed )  _____        Mltpl Pack Ind ) N CMD    PACK   Free Cyls   Begin       End
 ---    ----   ---------   ---------   ---------
 ) _    PROD01    7560       25200       32759
 ) _    PROD03     560       32200       32759
 ) _    PROD04     560       32200       32759
 ) _    PROD05     560       32200       32759
 ) _    PROD06     560       32200       32759
 ) _    PROD07     560       32200       32759

Esssssssssssssssssssssssssssssssssssssssssssssssssssssssssssssssssssss
e ELUPACKS Warning: Cannot reserve space until  you provide a dataset
e name.
Dsssssssssssssssssssssssssssssssssssssssssssssssssssssssssssssssssssss
```

```
Seq Dataset   | Previous: EL.EOS.FINDX.
---  -------------------------------------
001  PC32108.BNKFORMS.JCL32783
002  PC32108.BNKFORMS.JCL32783.BACKUP
```

Fig. 10P

```
DSL V3.1 Directory for PC32108.BNKFORMS.JCL32783
Command ===>
    Name     Seq   Ver.Mod  Created   Last Modified
_   ASISRPT  0001
_   XEL8UA1  0002  01.00    07/28/17  07/28/17 13:15
```

Fig. 10Q

```
DSL V3.1 Directory for PC32108.BNKFORMS.JCL32783.BACKUP
Command ===>
    Name     Seq   Ver.Mod  Created   Last Modified    S
    XEL8A1   0001  01.00    07/28/17  07/28/17 13:15
```

SYSTEMS, DEVICES, AND METHODS FOR MAINFRAME DATA MANAGEMENT

CROSS-REFERENCE TO RELATED APPLICATIONS

This patent application is a continuation of U.S. patent application Ser. No. 16/231,084, filed on Dec. 21, 2018, which is a continuation of U.S. patent application Ser. No. 15/823,293, filed on Nov. 27, 2017, which claims a benefit of priority to U.S. Provisional Patent Application Ser. No. 62/427,085, filed on Nov. 28, 2016, all of which are herein incorporated by reference in their entireties for all purposes.

TECHNICAL FIELD

Generally, this disclosure relates to mainframes. More particularly, this disclosure relates to advanced management of applications on mainframe systems.

BACKGROUND

A mainframe can host a software application programmed to manage an output stream, as the output stream is generated, while remaining agnostic as to an origin of the output stream. Resultantly, the software application can be programmed to automate report data capture, archiving, retrieval, or destruction, based on the output stream and a set of rules for each type of output stream.

When the software application is an Enterprise Output System (EOS) software application, as provided by RSD America Inc.®, then this software application is implemented as a series of continuously running programs (started tasks) which need to be monitored, and are complicated to administer due to presence of many environments within the EOS, a multitude of different configuration settings within each environment, synchronization of configuration settings across environments, security settings for thousands of users, and handling of many data inputs/outputs. Therefore, various misconfigurations/errors may arise. Likewise, such complexity is difficult to administer, which leads to greater resource use, greater expense, and a higher error rate for configuration changes made. Similarly, such complexity entails that an administrator of the EOS application be experienced/proficient, which is not always possible.

Examples of technical problems resulting from manually administering the EOS are numerous. Some of such examples include failed ingest jobs caused when a user requests a modification to an EOS form index, which occurs while a job, written in Job Control Language (JCL), is ingesting a multi-part report into the EOS. As such, the ingestion will fail because the form index is being modified in the EOS. Further, some of such examples include lack of monitoring of the many started tasks within the EOS because manually doing so is time consuming and complicated since few resources are dedicated and skilled enough to do such monitoring on a regular basis. Therefore, various undesired events or delays can occur in the EOS without notice, which may be expensive to repair at that time. Moreover, some of such examples include the EOS making use of a large number of model JCLs that are executed on a regular basis. When massive or voluminous changes need to be made to these model JCL's, and these changes are manually made, then there is a likelihood that a particular component of the EOS application may fail due to a mistake within these model JCL's. Additionally, some of such examples occur when a new report is manually defined to an EOS form index file, and then the changes have to also be replicated to similar test environments. Human errors from performing this repetitive work, such as digit transposition or setting misconfiguration result in failures to successfully ingest instances of these new reports in those environments. Also, some of such examples occur when some activities are done in administration of EOS metadata using tools supplied by the EOS and various details in various activity logs are not sufficient. This insufficiency complicates remedial research for various administrative actions that caused a user problem. Furthermore, some of such examples occur because the EOS is complex and can be used in various technical environments. As such, the administrator can build subject matter expertise and efficient workflow over a long time period. In addition, some of such examples result from the EOS running 24/7 and the administrator or an expert in the EOS may not be available when needed, and various users must suffer from a lack of use of the EOS until the administrator or the expert can be located to fix. Accordingly, there is a desire for a computing technology to address at least one of such technical challenges.

SUMMARY

This disclosure at least partially addresses at least one of the above challenges. However, this disclosure can prove useful to other technical areas. Therefore, at least some claims should not be construed as necessarily limited to addressing any of the above challenges.

In one embodiment, a method comprises: loading, by a processor, a utility program onto an operating system of a mainframe, wherein the operating system hosts an application that includes a plurality of running jobs, wherein the utility program includes a set of configuration metadata for the application; configuring, by the processor, the utility program such that the utility program is configured to receive a user input from a workstation that is in communication with the mainframe and the utility program is configured to interface with the application based on the set of configuration metadata responsive to the user input, wherein the mainframe is in communication with the workstation; creating, by the processor, a job via the utility program interfacing with the application based on the set of configuration metadata responsive to the user input; submitting, by the processor, the job to the application via the utility program interfacing with the application based on the set of configuration metadata responsive to the user input; querying, by the processor, the job at the application before completion for an error via the utility program based on the set of configuration metadata; triggering, by the processor, an alert based on the set of configuration metadata via the utility program responsive to the error; and outputting, by the processor, the alert to the workstation in communication with the utility program.

In one embodiment, a system comprises: a mainframe containing a processor that hosts an operating system, wherein the operating system hosts an application that includes a plurality of running jobs, wherein the mainframe is configured to: load, by the processor, a utility program onto the operating system, wherein the utility program includes a set of configuration metadata for the application; configure, by the processor, the utility program such that the utility program is configured to receive a user input from a workstation that is in communication with the mainframe and the utility program is configured to interface with the application based on the set of configuration metadata responsive to the user input, wherein the mainframe is in communication with the workstation; create, by the processor, a job via the utility program interfacing with the application based on the set of configuration metadata responsive to the user input; submit, by the processor, the job to the application via the utility program interfacing with the application based on the set of configuration metadata responsive to the user input; query, by the processor, the job at the application before completion for an error via the utility program based on the set of configuration metadata; trigger, by the processor, an alert based on the set of configuration metadata via the utility program responsive to the error; and output, by the processor, the alert to the workstation in communication with the utility program.

Additional features and advantages of various embodiments are set forth in a detailed description which follows. Various objectives and other advantages of this disclosure are realized and attained by various structures particularly pointed out in various exemplary embodiments in the detailed description and claims hereof as well as in a set of appended drawings. Note that the detailed description is exemplary and explanatory and is intended to provide further explanation of this disclosure as claimed.

BRIEF DESCRIPTION OF DRAWINGS

The accompanying drawings constitute a part of this specification and illustrate an embodiment of the present disclosure and together with the specification, explain the present disclosure.

FIGS. 3a and 3b show a set of screenshots of a front end of a security maintenance tool of a utility according to this disclosure.

FIGS. 4a-4e show a set of screenshots for a form group maintenance functionality of a security maintenance tool according to this disclosure.

FIGS. 5a-5c show a set of screenshots of a form group assignment functionality of a security maintenance tool according to this disclosure.

FIG. 6 shows a screenshot of a front end of an application administration tool of a utility according to this disclosure.

FIG. 7 shows a screenshot of an online dashboard monitoring tool selected for option 1 according to this disclosure.

FIGS. 8a-8i show screenshots of multiple maintenance tools selected for option 2 according to this disclosure.

FIGS. 9a-9c shows a set of screenshots of maintenance tool to define components to EOS, selected for option 3 according to this disclosure.

FIG. 10a-10r shows screenshots of multiple maintenance tools selected for option 4 according to this disclosure.

FIGS. 11a-11f shows screenshots of multiple tools selected for option 5 according to this disclosure.

DETAILED DESCRIPTION

Generally, this disclosure discloses a logic, such as a utility, that interfaces with a plurality of groups of users and an application, such as an EOS application. The logic is logically hosted between the groups of users and the application. The logic enables the groups of users to input what should be done. Then, the logic generates and submits on-demand jobs that execute a set of tasks that can be performed via batch. Before a job is done, the job goes through a set of edits within the logic, which reduces errors and increases availability. The logic further allows co-generation, where a user can define a job change, create a prototype based on the job change, and then have that prototype replicated so that the prototype minimizes an amount of manual coding that takes place and instead having the logic modify or generate those components. Therefore, this technology enables utility programs to run on multiple mainframes to periodically monitor a list of started tasks that have been defined in metadata files as running on each mainframe. Some of the utility programs can be largely driven by metadata, and include filters programmed to manage an output stream for each started task, as the output stream is generated, while remaining agnostic as to an origin of the output stream. When problems are detected in the output stream, users can notified via alerts, along with a suggestion of what to do. This batch dashboard application can be used by anyone with mainframe started tasks that need to be monitored. Once alerted to a problem, the users can logon to the online dashboard for that same list of started tasks and take actions to research and fix the problems.

Figure 1:
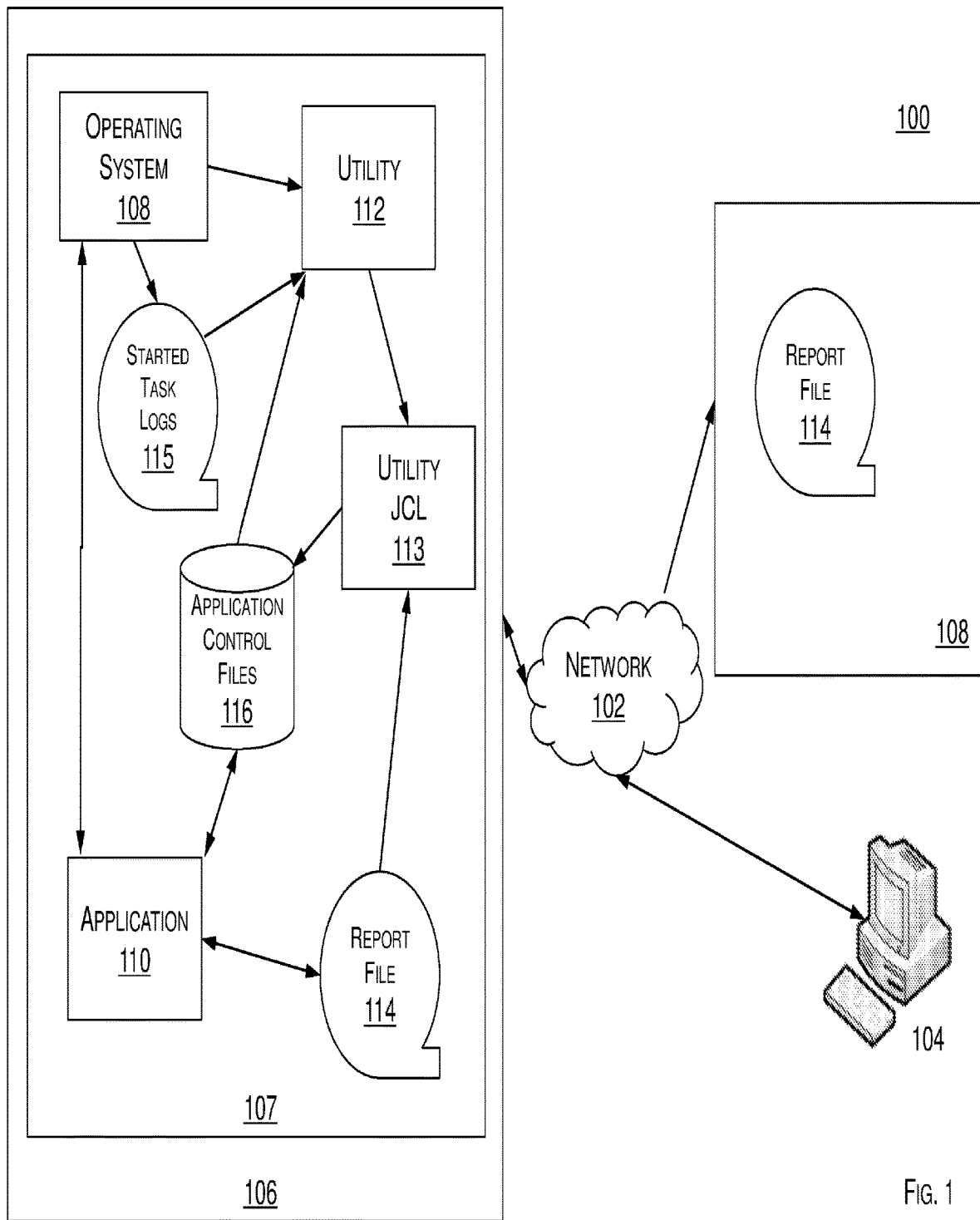
FIG. 1 shows a schematic diagram of an embodiment of a mainframe according to this disclosure.

FIG. 1 shows a schematic diagram of an embodiment of a mainframe according to this disclosure. A topology 100 depicts a network 102, a workstation 104, a mainframe 106, and a server 108. Each component of the topology 100 can be implemented in a logic, whether hardware-based or software-based. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component.

The network 102 is communicably interposed between the workstation 104, the mainframe 106, and a file share 114 on the server 108. For example, the network 102 can include a local area network (LAN). The network 102 can be established via a telecommunication circuit. The network 102 can employ circuit switching or packet switching methods. The network 102 can employ network protocols including Transmission Control Protocol (TCP)/Internet Protocol (IP), which can be used to deliver transport and addressing functions. However, other communication protocols can be used, whether additionally or alternatively, in whole or in part, such as File Transfer Protocol (FTP), Network Data Mover (NDM), Ethernet, Internet Message Access Protocol (IMAP) Internet Control Message Protocol (ICMP), Hypertext Transfer Protocol (HTTP), or others. The network 102 can comprise circuit switched telephone lines, radio wave transmission, or optic fiber. In some embodiments, the workstation 104 and the mainframe 106 communicably interface with each other thru the network 102. In other embodiments, the mainframe 106 sends files to the server 108 to reside as the report files 114, via the network 102.

The workstation 104 is programmed to run an application and an operating system (OS), such as Windows, Linux, Android, MacOS, and/or others, where the application runs on the operating system. For example, the application can comprise a command prompt console, a browser, a productivity application, such as a word processor or a spreadsheet, a mobile app, or others. The application is programmed to display a graphical user interface (GUI), as disclosed herein. The GUI is programmed to display an output and receive an input. The workstation 104 is programmed to communicate with the mainframe 106 through the network 102, such as via a console emulator program, whether native to the OS or included in the application.

The mainframe 106 contains a processor 107 and a memory. Via the processor 107 and the memory, the mainframe 106 hosts, in parallel or in distribution an operating system 108, an application 110 (which includes a set of continuously running started tasks which continuously add data to started task logs 115), a utility 112, a JCL created and run by the utility 113, a set of application control files 116 used by the application, and a set of report files 114 managed by the application 110. The operating system 108 can include at least one of z/OS®, z/VM®, Linux®, z/VSE™, Linux for System z®, and z/TPF, or others. The application 110 can include a software application programmed to manage an output stream. For example, the software application can include an EOS software application, as provided by RSD America Inc. In the case of EOS, the output streams are report files 114. As the report files 114 are generated, the application 110 uses an origin of the report files 114 to determine which application environment it is to be stored in. The application 110 can be programmed to automate report ingest/archiving/retrieval/destruction based on the output stream and a set of rule inputs. The application 110 accepts output streams containing reports, then files them based on information contained about each type of report in the application control files 116. The report files 114 are archived based on instructions in the application control files 116, and access to the user community to these report files 114 is based on security instructions in the application control files 116.

Figure 2A:
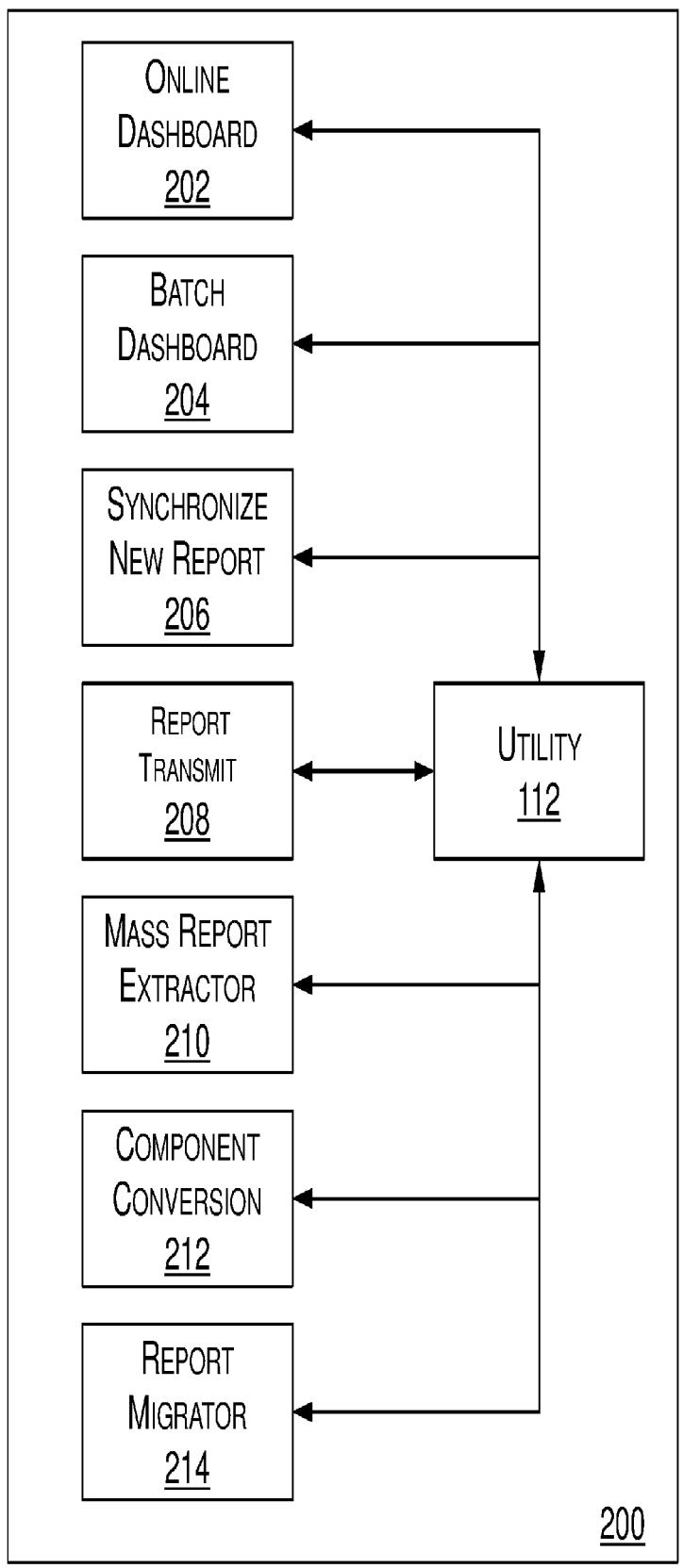
FIG. 2a-2c shows a schematic diagram of an embodiment of a utility according to this disclosure.
Figure 2B:
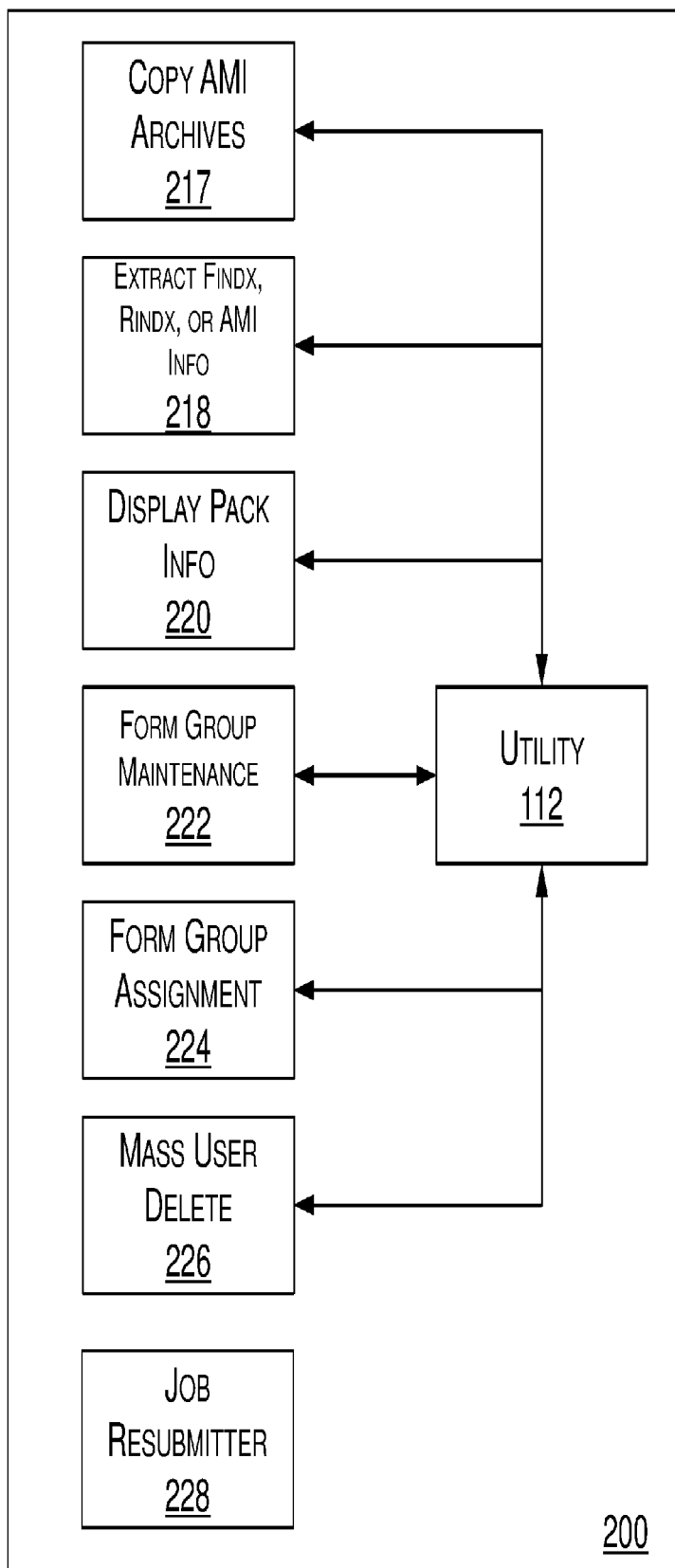
Figure 2C:
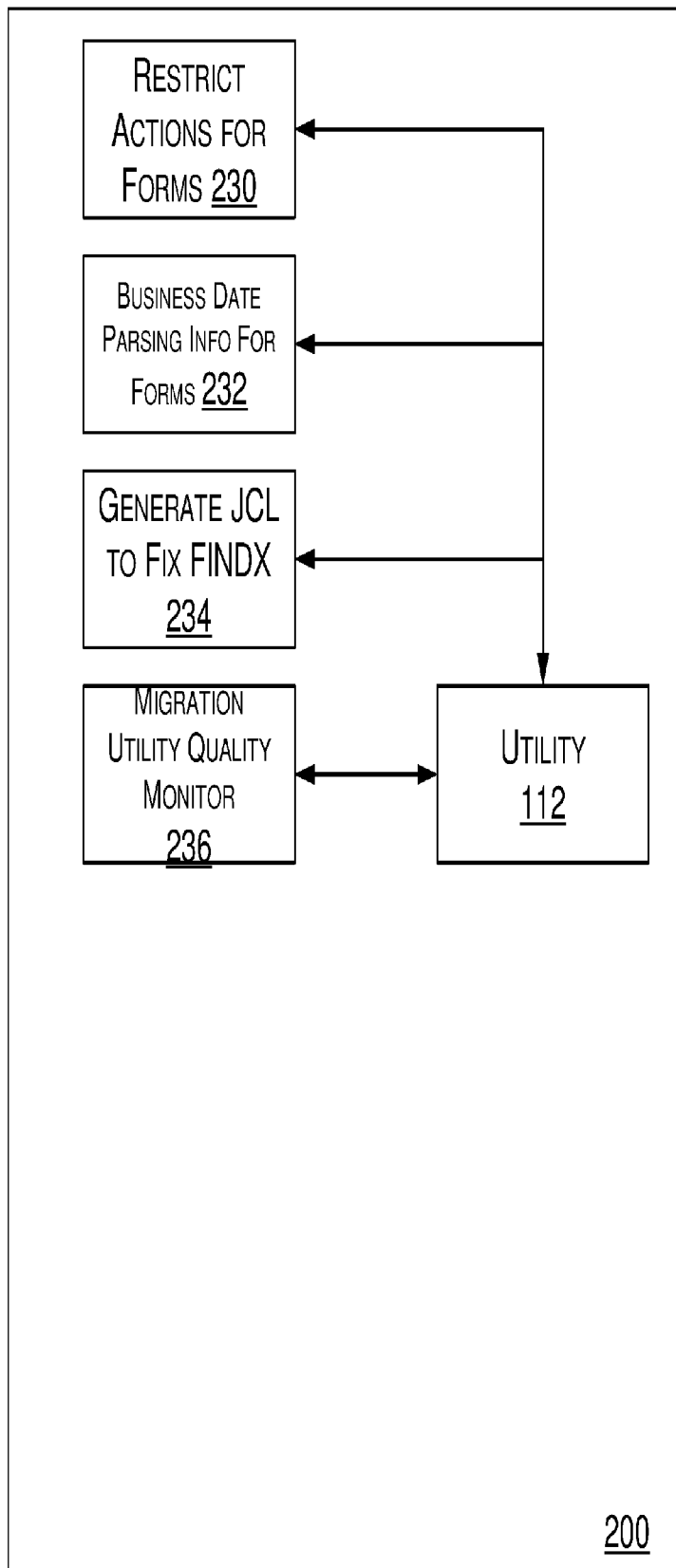

FIGS. 2a-2c show schematic diagrams of an embodiment of a utility according to this disclosure. In particular, a diagram 200, as shown in FIGS. 2a-2c, depicts that the utility 112 comprises or is in communication with an online dashboard component 202, a batch dashboard component 204, a synchronize new report component 206 for adding new reports, a report transmit component 208, a mass report extractor component 210, a component conversion component 212, a report migrator component 214, a copy archive master index (AMI) archive component 217, an extract form index (FINDX), a report index (RINDX), or AMI info component 218, a display pack info component 220, a form group maintenance component 222, a form group assignment component 224, a mass user delete component 226, and a job re-submitter component 228, any of which can be or include at least one of a module, a function, an object, a library, a program, an add-on, a script, or any other software. The utility component 112 controls the online dashboard component 202, the batch dashboard component 204, the synchronize new report component 206 for adding new reports, the report transmit component 208, the mass report extractor component 210, the component conversion component 212, the report migrator component 214, the copy AMI archive component 217, the extract FINDX, RINDX, or AMI info component 218, the display pack info component 220, the form group maintenance component 222, the form group assignment component 224, the mass user delete component 226, and the job re-submitter component 228 in order to perform any functionality disclosed herein. FIG. 2c shows a schematic diagram of additional components that the utility 112 can include or be in communication with. These additional components include a restrict actions for forms component 230, a business date of reports (B-Date) parsing info for forms component 232, a generate JCL to fix FINDX component 234, and a migration utility quality monitor 236.

The utility 112 simplifies monitoring and management of the application 110 product by an administrator, such as allowing complicated processes to be done faster, more accurate, and cheaper, while bringing down a learning curve. The utility 112 code analysis/generation/conversion capabilities allow many model JCL jobs to be programmatically created and maintained, thus increasing reliability of the application 110 and a movement of reports and report data. Note that a job includes a unit of work or unit of execution that performs a work. The job can include a component (as a unit of work), where the component can include a task or a step (if sequential, as in a job stream). As a unit of execution, the job can be concretely identified with a single process, which may in turn have sub-processes which perform one or more tasks or steps that include the work of the job. The job can be started interactively, such as from a command line, or scheduled for non-interactive execution by a job scheduler, and then controlled via automatic or manual job control. The job that has a finite input can complete, successfully or unsuccessfully, or fail to complete and eventually be terminated. Also, automated processes that define recurring NDM sessions, or new form IDs, allow more complicated interrelated processes to be developed than would be possible if defined manually. Due to the complicated interrelated processes that are possible, users of the application 110 derive more use from the application 110.

The utility 112 can operate in a production, quality control, or a test environment. The utility 112 interfaces with the application 110. The utility 112 is programmed to contain multiple layers of security ensuring that only authorized user can use the utility 112, such as via user credentials. The utility 112 includes a set of metadata about a configuration of the application 110. Use of this configuration metadata by the utility 112 makes it possible for users with less skill and experience to administer the application 110. The utility 112 is programmed to integrate with a Control-M command or a Control-O command, which may allow for a submission of a JCL job. The utility 112 is programmed to enable an addition of one or more new productivity apps to the utility 112 via modifying a file entry. The utility 112 is programmed to guide the user through a set of complicated actions, editing a user's responses, to avoid or minimize the impact of human error on the application 110. The utility 112 is programmed to enable and simplify automatic modification or recreation of a component when there is a change that may affect many programs or JCL jobs, which may avoid or minimize a manual component modification. The utility 112 is programmed to enable a flexible migration function, which allows a low skilled or an unskilled user to manage a complicated migration of files from one location or application 110 to another location or application 110.

The utility 112 may improve productivity of an administrator of the application 110, may allow for a synchronization of meta data changes across various sessions and environments of the application 110 in a test environment, quality control, or a production environment, may allow for more efficient use of the application 110, may allow a complex change to a program within the application 110, a model JCL component, or an application component, such as FINDX and RINDX, to be programmatically performed, may lower a cost of migrating a report, which would be a barrier to a migration without the utility 112, may provide a higher availability of the application 110 to a set of users because of minimization or avoidance of defects.

The utility 112 is programmed such that most changes thereto can be done without changing a code of the utility 112. The utility 112 behaves differently depending on where the utility 112 is launched, since the utility 112 is driven by metadata. The utility 112 includes multiple log files, depending on action being performed. These logs are viewable from almost all apps in the utility 112 (this is useful information when researching what has been done thru the utility 112). One of the log files in the utility 112 includes a jobs log file viewable from most apps that can submit jobs. This jobs log file has a history of all JCL jobs spawned by the utility 112, and submitted thru Control-O. Data generated by some or most apps may be retained for 1-3 days, although more or less is possible, during which time a user can correct a set of data and rerun a set of jobs, if there is a need. In case of a JCL job failure, the jobs log file can be read by the job re-submitter 228, and made available for being rerun. Each app of the utility 112 determines its own level of security, such as 1 thru 4, and prohibits a user without an appropriate clearance or credentials from using the utility 112. The utility 112 may use a compiled restructured extended executor (REXX) programs for added security (avoidance of tampering with code).

The utility 112 includes several options. Option 1 allows a view or an analysis of a status of each task that runs on that Parallel Sysplex, such as a cluster of IBM® mainframes acting together as a single system image with z/OS. From this option, a user can start or stop tasks. A user can also view or analyze a job log for each task. This is the Online Dashboard 202. A variation of the programming for the online dashboard 202 is run in batch mode every 2 or 3 hours to assess and report on the health of each started task in the Sysplex. This is the batch dashboard 204. Option 2 directs a user to applications which run (and rerun) an interactive JCL job or jobs in order to complete a set of work specified by a user. An application can be added or removed from this option without any programming (just metadata entries). Option 3 directs a user to an application which generates and defines new components to EOS in order to complete a set of work specified by a user, such as via the report transmit component 208. The user can also interface with a business date of reports (B-Date) table component 232, such as to update a B-Date table, to tell an EOS user how to parse reports to change an ingest date, or others. An application can be added or removed from this option without any programming (just metadata entries). Option 4 directs a user to an application which runs, validates, converts, or mass generates a component. Sometimes, a commonly used app may be a JCL Validator, which corrects an existing JCL job based on where a user intends to run the JCL job. Use of the JCL Validator avoids the incidents of failed jobs in a test, quality control, or production environments. The user can also be directed to an application to generate a JCL job to fix a problem in a report index, such as via the component 234. An application can be added or removed from this option without any programming (just meta data entries). Also, Option 4 enables a user to attach a conversion program that a user wishes to write, so long as the conversion program follows a design constraint, which would feed the conversion program with one component member at a time for conversion. This provides the conversion program with a services that allows a user to concentrate only on converting one component at a time and frees the conversion program from having to do file manipulation, member list selection, user entry editing, and line splitting.

The online dashboard component 202 is programmed to monitor a task started on the application 110 and analyze a logs of the task. Tasks can be started and stopped, with all actions being included in the log. User confirmation is requested and logged before any potentially harmful action is performed. Edits occur to prevent multiple concurrent users from unknowingly undoing the work of each other.

The batch dashboard component 204 is programmed to monitor all tasks started on the application 110 and send a message, such as email over the network 102, to the terminal 104, which may be operated by a subject matter expert when a problem is detected.

The synchronize new reports 206 component is programmed to run only in the Production environment when new form identifiers (formIDs) have been requested. This utility will add the formIDs across all environments (production, test, and quality assurance) of EOS, making sure that every aspect of the formIDs creation process is in sync. The synchronize new reports 206 may also replicate formIDs into multiple shadow feed forms in the test environment, to allow for testing in multiple Customer Information Control System (CICS) regions at the same time.

The report transmit 208 component is programmed to generate a model JCL to extract and send, such as via an FTP or NDM session, a report (such as an EOS report). The utility then causes the EOS FINDX to be updated for that EOS report's formID, to create a triggering process that makes use of the model JCL just created.

The mass report extractor 210 is programmed to extract a set of reports for a time period into a set of files, or a single file at the specification of the user. This utility makes it easy to efficiently extract of large numbers of reports for users that wish to analyze the data. Extraction using this utility improves productivity because it makes use of EOS RINDX to anticipate the size of output file needed. Tracking of extracts is also facilitated by a better audit trail.

The Component Conversion 212 component is programmed to facilitate generation, validation, or conversion of a JCL, program, or script. This component minimizes the introduction of user errors in mass component changes.

The report migrator 214 component is programmed to manage and execute a migration of a reports to or from one place or application 110 to another. For example, the report migrator 214 can be programmed to size a migration effort, determine the number of concurrent processes to be executed; builds all data sets necessary for concurrent processing; builds all JCL jobs, and track the progress of all JCL jobs as they convert and ingest items to the target system. Inputs from users would be the definition of a migration plan, where from and where to, and how much time is available to complete the migration; the utility 112 then expects an extract file or generates an extract file; the utility 112 recommends a sizing of an effort, and then a user approves/modifies the recommendation; then this extract file is used to generate the JCL jobs that will execute the migration. The sizing of the effort determines how many concurrent threads will be used. Each thread is called a set and for every two sets a copy is built from various indexes, to avoid contention of the JCL jobs as they run.

The copy AMI archives 217 component is programmed to copy archive files from 1 AMI to another. This is necessary when you want to split 2 EOS environments.

The extract FINDX, RINDX, or AMI 218 component is programmed to allow an administrator to select records from any FINDX, RINDX, or AMI to a sequential dataset. This is useful for analysis of the contents of any of these control files, troubleshooting problems, or getting input to other components of this utility. The output can be placed in a number of formats for ease of use.

The display pack info 220 component is programmed to allow an administrator to identify a pack that has enough free space for an intended purpose, then to reserve space on that pack so no other administrator tries to reuse the same space. Once the space is reserved by an administrator, it will be displayed to other administrators for the remainder of the day as unavailable space. The user of this component can filter the display based on the number of cylinders that are required for the new dataset.

The form group maintenance 222 component is programmed to allow users with the correct authorization for an EOS Session and Environment to add, update, and delete form groups. Form Groups in EOS limit the reports that can be seen by users, beyond what the user group allows a user to see. All changes to form groups are added to a log that cannot be subsequently changed by the users. The purpose of this application is to allow users to change form groups, without allowing them to change other security settings in the EOS Profile.

The form group assignment 224 component is programmed to allow users with the correct authorization for an EOS Session and Environment to add, change, or delete the form group that other users in that EOS Session and Environment are assigned to. Form groups assigned to a user limit the forms that can be seen beyond what a user group limits them to. If a form group for a user is deleted, it expands the user's access to reports, if a form group is added, it could limit the group of reports that a user can see. The purpose of this application is to allow users to change form groups, without allowing them to change other security settings in the EOS Profile.

The mass user delete 226 component is programmed to allow administrators to remove all access for a list of users to EOS for a Session and Environment. All deletes are logged for audit purposes. Each year the administrators of each EOS Session and Environment will review those with access to their system. At that time, large numbers of users' access may be identified to be removed. This component allows that to be done in an efficient and secure manner.

The job re-submitter 228 component is programmed to allow administrators to resubmit any job submitted thru this utility within the past 3 calendar days. Jobs submitted in the other components of the utility periodically fail for one reason or another. Sometimes failure is caused by contention with other jobs, sometimes it is caused by an error. After the error is corrected, or the probability of contention has passed, the job re-submitter will restart the selected job and add that action to the log. This component allows a user to fix problems without having to reenter a request from scratch.

FIGS. 3a and 3b show a set of screenshots of a security maintenance tool of a utility according to this disclosure. This utility is controlled by a Resource Access Control Facility (RACF) secured metadata. The security maintenance tool allows a subset of authorized users of the application 110 to navigate to apps which would allow them to maintain various parts of the EOS Profile. FIG. 3a shows an entry point to the security maintenance tool. FIG. 3b shows the apps available to modify the form groups. The three apps shown (FG, FR, and UF) display because of entries in the metadata for the tool. The apps can be removed or added simply by adding, updating, or deleting lines in the meta data which this security maintenance tool reads.

FIGS. 4a-4e show a set of screenshots for a Form Group maintenance functionality of a security maintenance tool according to this disclosure. The form group maintenance tool 222 allows a set of users of the application 110 to maintain form groups within the profile of the application 110. This allows the set of users to update a portion of a profile of the application 110 information, without an exposure to most features of a set of profile administration screens provided by the application 110. Additionally, an app included in this utility may insulate the profile from a user error by providing an extensive edit of user entered data. This functionality protects a user authorized for a first environment of the application 110 from maintaining a form group in a second environment of the application 110. Also, this functionality enables a user to be authorized to use a certain app, including to a specific environment of the application 110. This functionality also enables a user to view a list of all current users of a form group. This functionality also enables a query of a list of current users for a particular user. This functionality also enables an addition or deletion of a form group, as well as addition and deletion of a form ID that are all executed as a series of on-demand jobs that are submitted thru a Control-O command. This functionality also enables a feature where if multiple jobs are submitted, then the multiple jobs are chained together via a REQUIRE card to run serially, where necessary. This functionality also enables a recordation of all activities in a log (see FIG. 4e), where each entry of the log is more detailed than a log entry kept within the application 110. Therefore, these detailed log entries can later be analyzed to help determine a cause of future access issues, if any. This functionality also enables a feature where a form ID entry or a form group is not be deleted without an explicit confirmation of a user.

FIG. 5a shows a screenshot of a form group assignment functionality of a security maintenance tool according to this disclosure. This functionality enables an authorized user to add, change, or delete a form group for any user. This functionality also enables use of a form index or a profile list file that are periodically refreshed, such as every 12 hours, every 2 weeks, or others. This functionality also enables a display of a set of user info that can be sorted by any numbered column, or a combination of columns, where a column value can be filtered. This functionality also enables an original display of a user assignment that is re-displayable after sorting or filtering. This functionality also enables a use of an F-command to position to a particular user in a list. This functionality also enables a user change to be arranged into a series of ad-hoc jobs submitted thru a Control-O command. A purpose of the above mentioned features is to allow authorized users to enter directives to the EOS Security or improve their productivity and effectiveness when assigning form groups to users. All actions that cause changes to the formID or profile of the application 110 are put in a detailed log for later tracking and analysis if problems occur.

Figures 5C, 6:
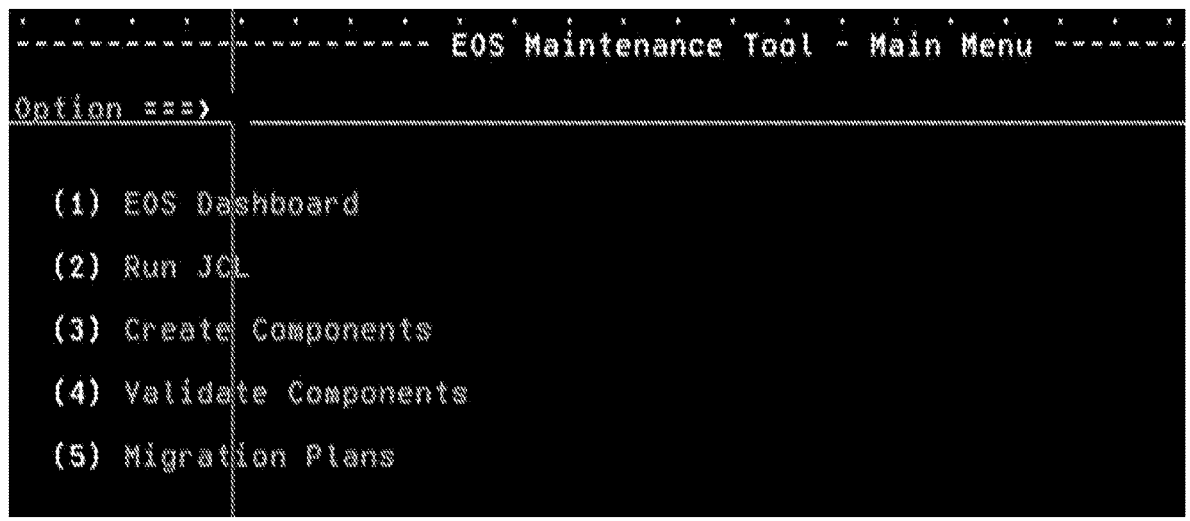

FIGS. 5b-5c shows screenshots of excluded actions for formID functionality of a security maintenance tool according to this disclosure. This functionality enables an authorized user to add or delete an excluded action such as PRINT, EXPORT, or VIEW for any formID for all users. This functionality also enables a use of a form index list file that are periodically refreshed, such as every 12 hours, every 2 weeks, or others. This functionality also enables a display of formID that can be sorted by any numbered column, or a combination of columns, where a column value can be filtered. This functionality also enables an original display of a formID its restricted function that is re-displayable after sorting or filtering. This functionality also enables a use of an F-command to position to a particular formid in a list. A purpose of the above mentioned features is to allow authorized users to enter directives to the EOS Security or improve their productivity and effectiveness when excluding actions for formids. All actions that cause changes to the formID are put in a detailed log for later tracking and analysis if problems occur.

FIG. 6 shows a screenshot of an application maintenance tool of a utility according to this disclosure. This tool is used on a production system and a test system in order to improve productivity of an application support administrator. In this tool, all performed actions are logged and usage is controlled by a security program running therein. This utility is controlled by a Resource Access Control Facility (RACF) secured metadata.

FIG. 7 shows a screenshot of a maintenance tool selected for option 1 according to this disclosure. This screenshot has various features which enables various functions including (1) an online dashboard and batch dashboard use same programming, (2) all application started tasks and their current statuses are evaluated (both), (3) a current log of each active started task can be displayed to user (online dashboard only), (4) a current log of each active started task is analyzed for problems (both), (5) if problems are identified, then a specified user, such as an administrator, is notified via email (batch dashboard only), (6) active tasks can be stopped (online dashboard only), and (7) an inactive task can be started (online dashboard only).

Figure 8B:
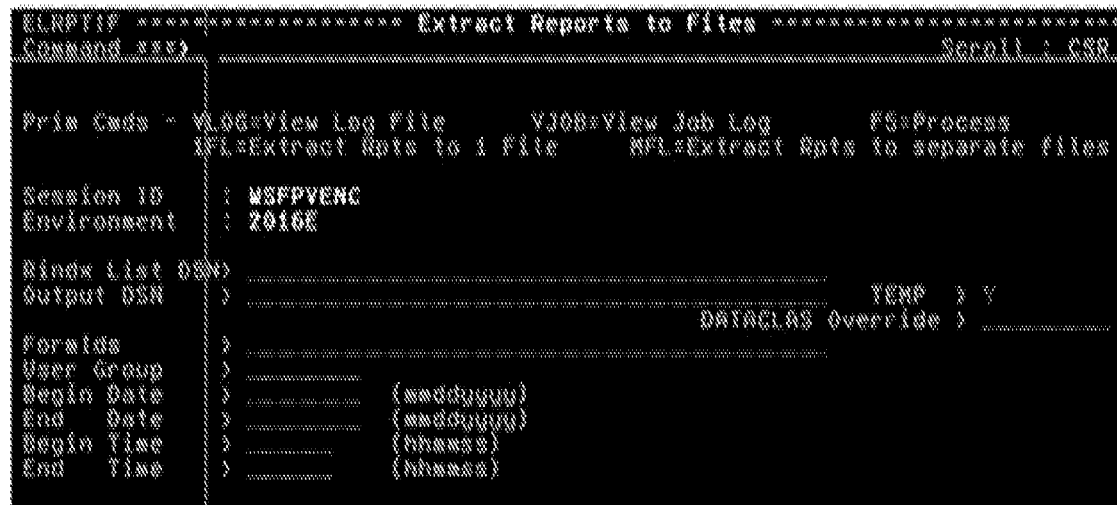

FIGS. 8a-8i show screenshots of multiple maintenance tools selected for option 2 according to this disclosure. These include the mass report extractor component 210, synchronize new report component 206, report transmit component 208, Extract FINDX, RINDX, or AMI info component 218, and job re-submitter component 228, as shown in FIG. 2c. In FIG. 8a, this screenshot has various features which enables various functions including (1) apps (primary commands—Prim Cmds) can be added, removed, or disabled without programming, (2) different apps available on test versions or production versions of the utility 112 without programming, (3) multiple activity logs can be viewed, and (4) apps executed in option 2 cause a submission of an ad-hoc job(s) thru a Control-O command, under a group ID, such as in production only.

FIG. 8b shows a screenshot of a tool used to extract a large number of reports in a session and environment into one or to many files. The use of this tool will (1) reduce the time needed to create one or many extract files in response to periodic requests, (2) reduce the skill needed to create extract files, (3) counts the number of lines in total to be extracted for each file (for proper allocation), and (4) regulate what can be done in a single session. The creation of all extract files is logged in detail for future reference.

Figure 8C:
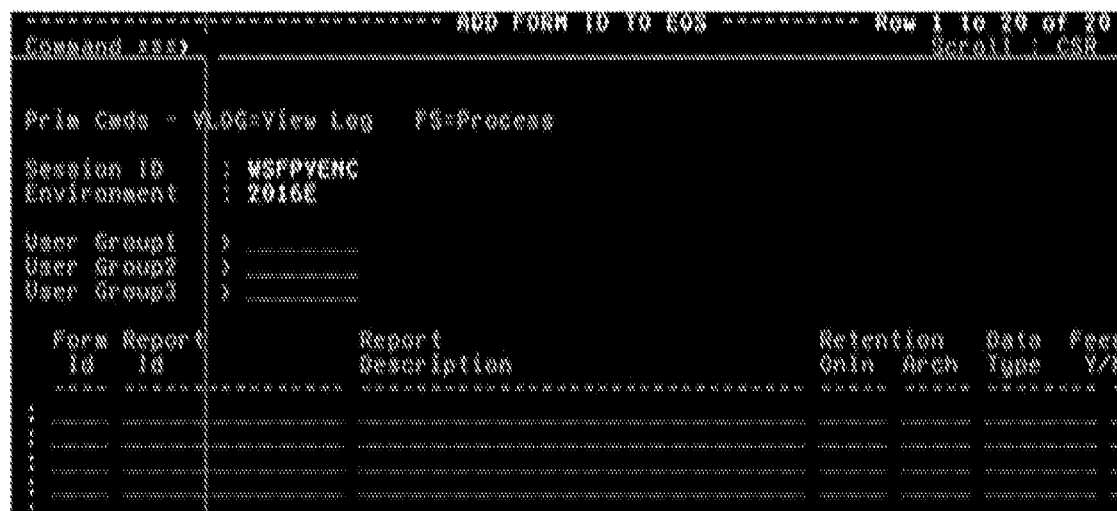
Figure 8D:

FIGS. 8c and 8d show screenshots of a tool to define new formIDs to the application 110. Various features which enables various functions include (1) simplifies a process of adding a formID to the application 110 (can be done by support personnel), (2) formIDs are added to a production environment(s) and a test environment in a single action, (3) formIDs can be added to multiple feed forms, applying same split criteria in production and test environments, (4) tight editing of user entered data to reduce risk of errors, and (5) generates a model JCL component in production and test environments for execution when report is ingested using these new formIDs.

Figure 8E:
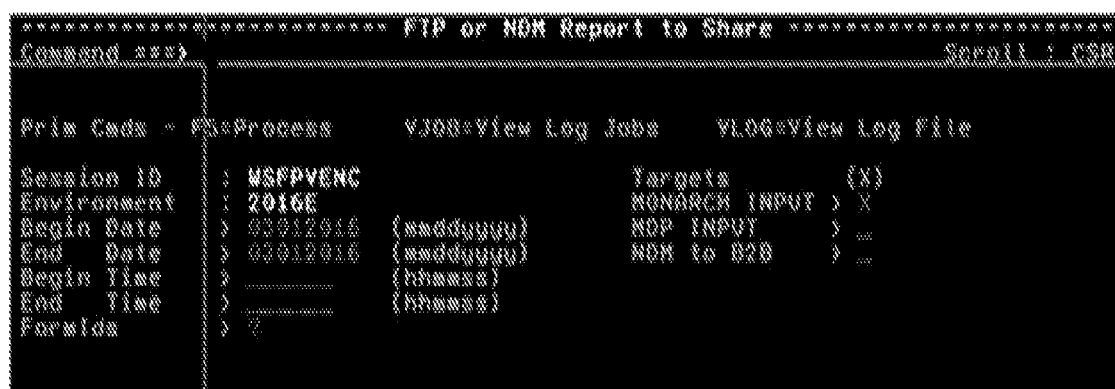
Figures 8F, 8G:
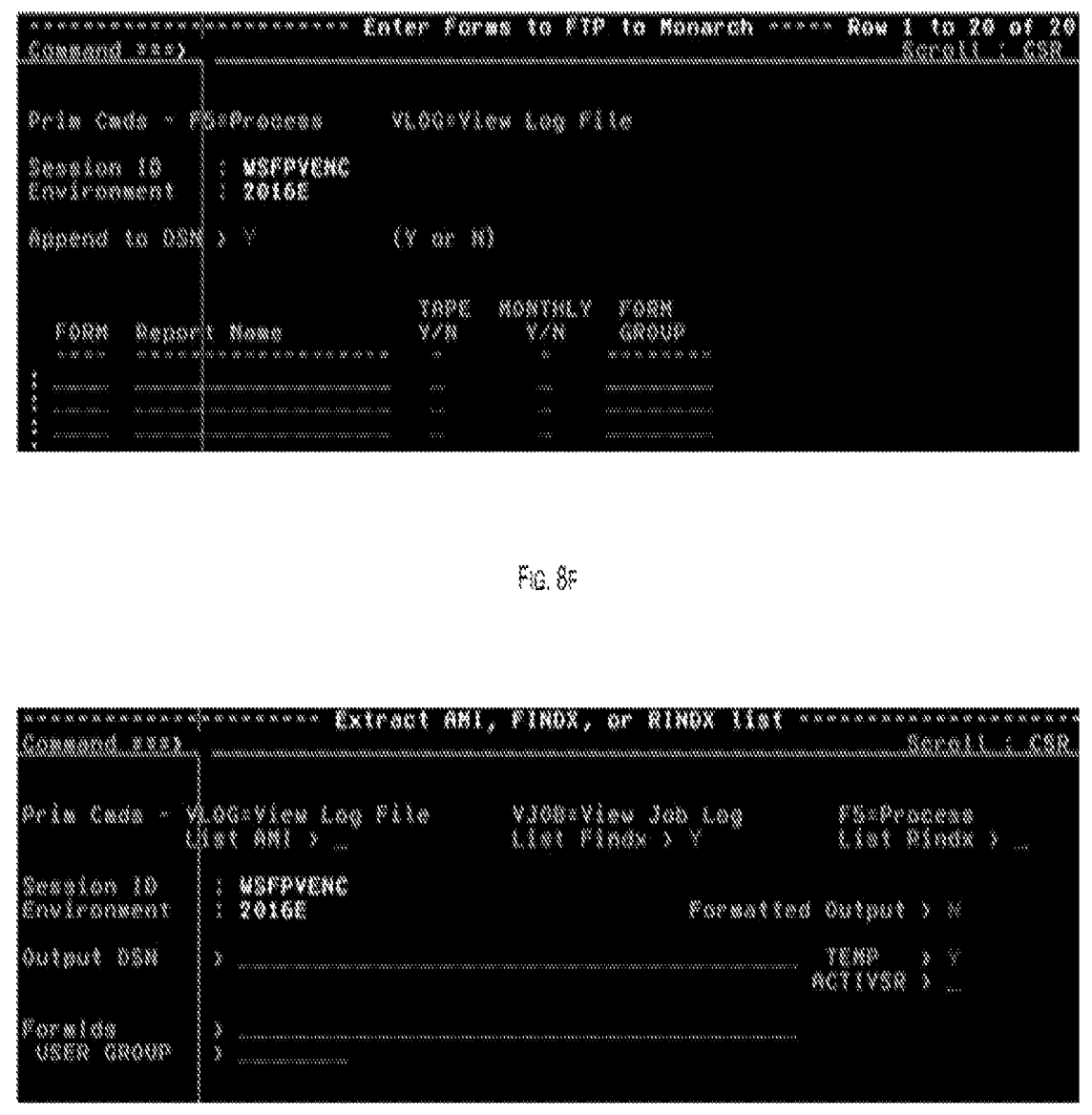

FIGS. 8e and 8f show screenshots of a tool to execute an immediate transfer of a report already ingested in the application 110 to specific locations. This has various features which enables various functions including (1) an execution when a user is notified that a scheduled FTP transfer or NDM have failed, and (2) multiple reports for this date/time range can be extracted and sent to a share(s) resource.

Figure 8H:

FIGS. 8g and 8h show screenshots of a tool to extract records from an AMI, FINDX, or RINDX. Depending on the type of file to extract records for, the screens will have different fields that need to be entered by the user. Extracted records from AMIs, FINDXs, and RINDXs are required by many utility 112 apps, which this app supports. Various features of this tool enables various functions including (1) simplification of producing a list, using various options, (2) estimates a size of a list based on a set of selection criteria, and allocates an output file accordingly, and (3) different selection criteria fields available depending on a type of list to produce.

Figure 8I:

FIG. 8I shows a screenshot of a tool that allows resubmission of any job that has been executed from the utility 112 in the past 3 days. This tool provides the following benefits: (1) is useful when jobs have failed because of bad data entry or job to job timing issues, (2) resubmitted jobs are properly logged.

Figure 9A:
Figure 9B:
Figure 9C:
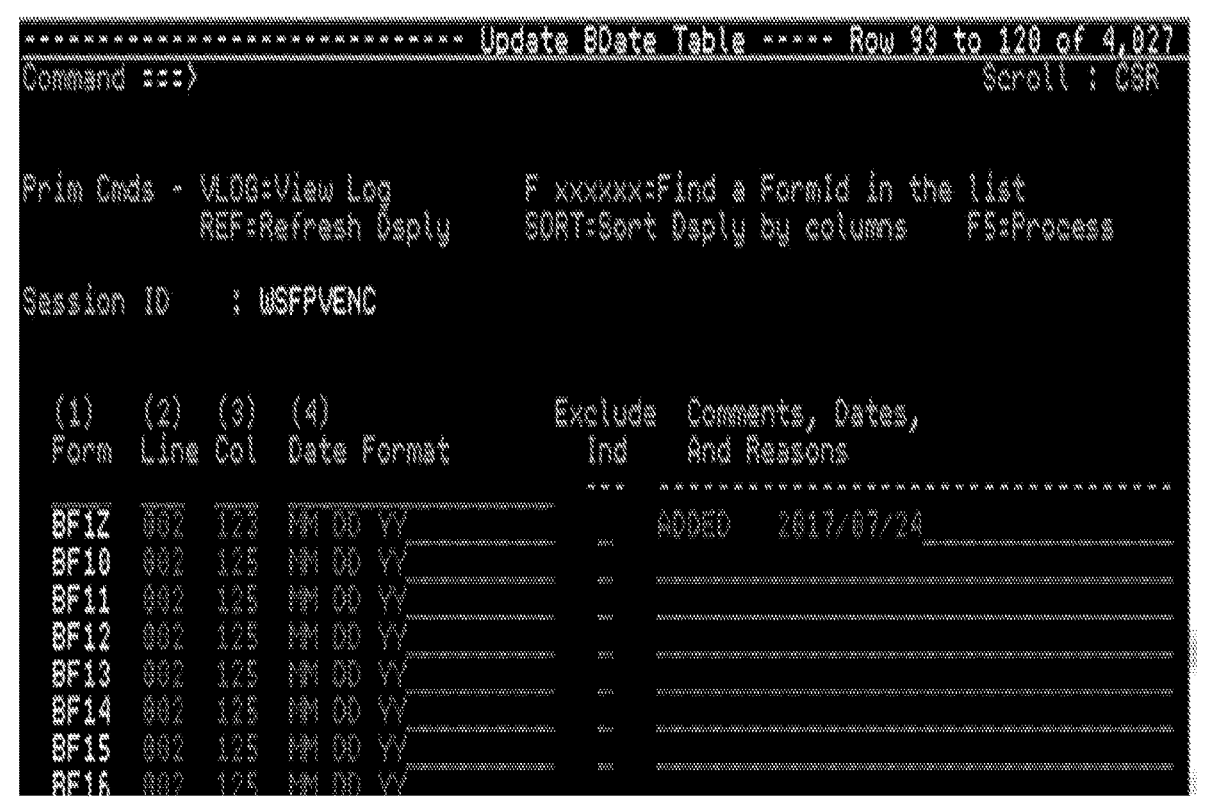

FIGS. 9a-9c shows a set of screenshots of maintenance tool to define components to EOS, selected for option 3 according to this disclosure. FIG. 9a shows a screenshot of a menu after selection of option 3, where applications are available from this menu to make changes to EOS system files. FIGS. 9b-9c show a set of screenshots of multiple maintenance tools selected for option 3, where the maintenance tools includes a report transmit tool (208) and a tool to define a process to transfer copies of reports as they are ingested, and a tool for business date parsing information for forms (232).

In particular, FIG. 9a shows a screenshot of a maintenance tool selected for option 3 according to this disclosure. This screenshot depicts a user interface that is presented using the same programming as that which presents the user interfaces of FIGS. 3b, 8a, 9a, 10a, and 11a, but adjusted for content of FIG. 9a. This tool has features which enable various functions including (1) the contents of these screens are determined by metadata entries for each option selected in the screens depicted in FIGS. 3a, and 6, (2) the apps presented with each option as Prim Cmds can be added, removed, or disabled without programming, (3) different apps can be available on a test and production versions of the utility 112 without programming, and (4) multiple activity logs can be viewed.

FIG. 9b shows a screenshot of a maintenance tool to define a recurring FTP or NDM of newly ingested reports. This has various features which enables various functions including (1) automation of the creation of model JCL components that will be used to perform the FTP or NDM when a new report is ingested. (2) FTP or NDM processes can be added in one step for multiple formIDs, (3) various options can be selected that direct how the FTP or NDM will be performed, and how large the reports normally are.

Figures 10N, 10O:
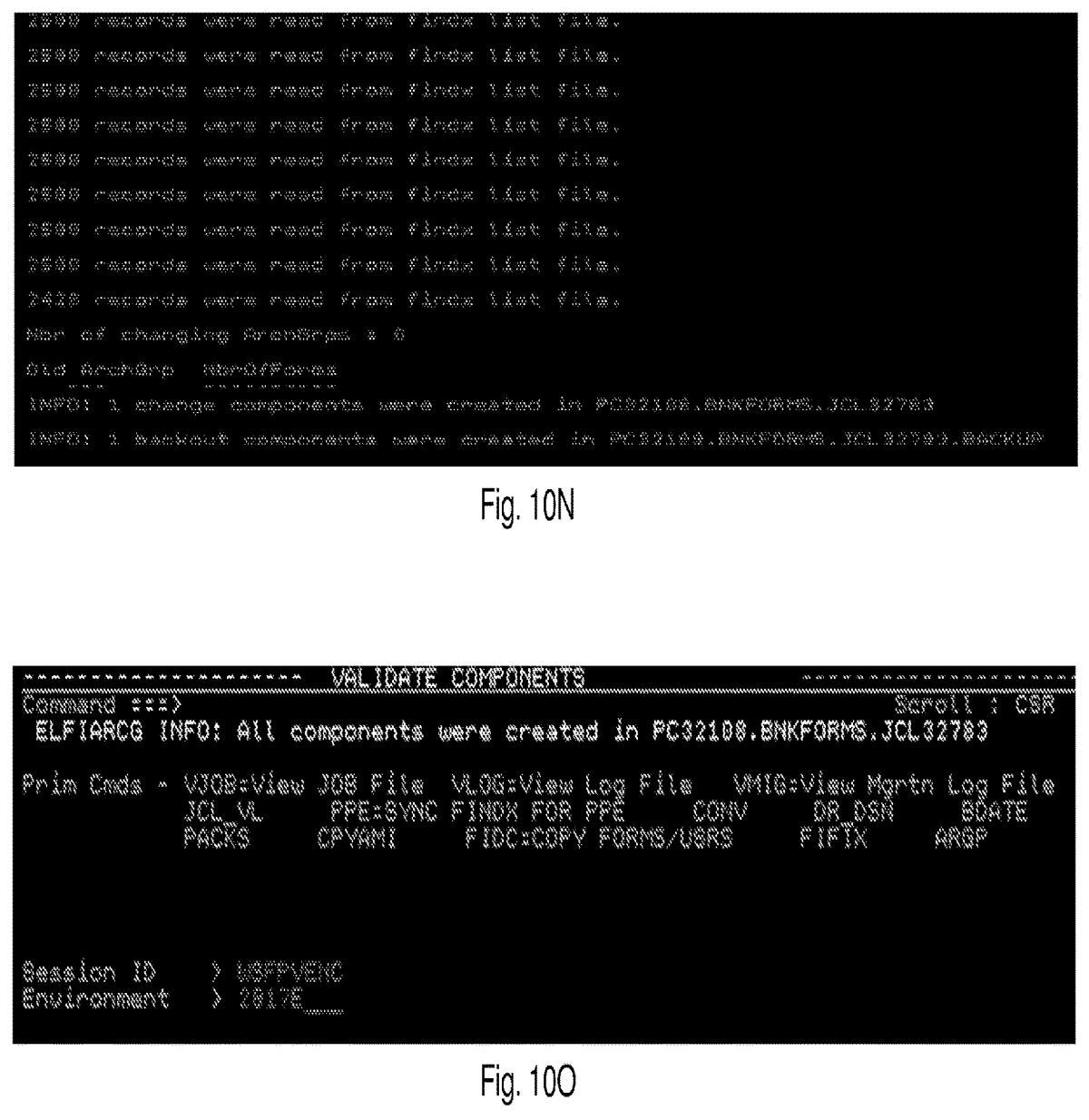

FIG. 10a-10r shows screenshots of multiple maintenance tools selected for option 4 according to this disclosure. FIG. 10a shows a screenshot of a menu after a user has selected option 4, where various applications are available from this menu are used to validate, convert, or generate components. FIGS. 10b-10r show various screenshots of multiple maintenance tools selected for option 4. These include the component conversion component (212), the B-Date table validation, component validation, and Display Pack Info component (220), generate a JCL job to fix a form index problem component 234, as shown in FIG. 2c.

Apps executed in this option are used to generate, modify, validate and correct source code (also used to display system info, and identify inconsistencies in components). FIG. 10*a* shows a screenshot of a user interface that is presented using the same programming as that which presents the interfaces of FIGS. 3*b*, 8*a*, 9*a*, 10*a*, and 11*a*, but adjusted for content of the apps. This tool has features which enable various functions including (1) the contents of these screens are determined by metadata entries for each option selected in the screens depicted in FIGS. 3*a*, and 6, (2) the apps presented with each option as Prim Cmds can be added, removed, or disabled without programming, (3) different apps can be available on a test and production versions of the utility 112 without programming, and (4) multiple activity logs can be viewed.

FIG. 10*b* shows a screenshot of a maintenance tool that allows an administrator to validate JCL that is intended to run against an EOS session and environment, and identify recommended changes (if any). This tool has various features which enables various functions including (1) edits a JCL job to make sure that correct Datasets are used for an indicated environment, (2) a user specifies a type of component, and a dataset that a JCL job is in, (3) a user can see what changes have been recommended, and edit a JCL component to make corrections.

FIG. 10*c* shows a screenshot of a tool that identifies forms who require entries in the BDATE table. The BDATE table defines to EOS application 110 reports that are parsed for business dates in the contents of each report as it is ingested to determine the date that the report is stored for. This screenshot has various features which enables various functions including (1) produce a report of form IDs to investigate for possible addition to the BDATE table. Note that BDATE is a user exit produced by RSD to parse all reports at ingest time for their processing dates. The processing dates found thru parsing are then used as the reports' ingest dates. The parsing data for all reports is contained on a flat file called the BDate Table.

FIGS. 10*d*-10*f* show screenshots of a set of tools designed to generate or convert one or more software components. This has various features that enable various functions, including (1) a framework for converting any type of component (a JCL job, a data file, a program source code, a panel etc.) and (2) a user identifies a type of conversion desired, and an input where a component exists. In FIG. 10*d*, is a screenshot of the first screen where the user identifies the conversion type and dataset where the input members are to be selected from. This tool (as embodied in FIGS. 10*d*-10*f*) has various features which enables various functions including (1) all selected components are fed (one at a time) to a conversion program for a desired code modifications to be made, and placed in an output, (2) all converted lines are passed thru rules specific to a component type to ensure that a line length, and continuation rules are adhered to, and (3) a new conversion program can be plugged into a utility simply by a meta data change. FIG. 10*e*, this screenshot allows for the selection of the type of conversion that is desired. New conversion programs can be plugged into a utility simply by a meta data change. In FIG. 10*f*, this screenshot has various features which enables various functions including (1) display of the results of the conversion, (2) a summary of the conversion is written to a log file for later reference.

FIG. 10*g* shows a screenshot of a tool to allow selection of which disk pack a file should be allocated on. This tool has various features which enables various functions including (1) certain virtual storage access method (VSAM) datasets reside on non-managed packs that are assigned to the application 110 (this app displays the application 110 assigned disk packs, listing available space on each), (2) a display can be limited to mirrored or non-mirrored packs, (3) if a user enters a cylinder requirement for an entered dataset, only those packs of a type desired with at least that amount of contiguous space are displayed, (4) multiple packs can be reserved for a dataset, and (5) once packs have been selected, that space is earmarked for that particular dataset until an end of a day to prevent others from also claiming the space.

FIGS. 11*a*-11*f* shows screenshots of multiple tools selected for option 5 according to this disclosure. In particular, FIG. 11*a* shows a screenshot of a maintenance tool selected for option 5 according to this disclosure. Apps executed in this option are used to assist in the planning and execution of efforts to migrate reports or other components from one application to another. This screenshot depicts a user interface that is presented using the same programming as that which presents FIGS. 3B, 8A, 9A, 10A, and 11A, but adjusted for FIG. 11*a*. This tool has features which enable various functions including (1) the contents of these screens are determined by metadata entries for each option selected in the screens depicted in FIGS. 3A, and 6, (2) The apps presented with each option as Prim Cmds can be added, removed, or disabled without programming, (3) different apps can be available on a test and production versions of the utility 112 without programming, and (4) multiple activity logs can be viewed, (5) apps executed in this option are used to plan and build out infrastructure for large migration efforts of reports and data from one place to another.

FIG. 11*b* shows a screenshot of a maintenance tool to plan a migration effort. This tool has various features which enables various functions including (1) allows a user to define an effort that will migrate data from one location to another, (2) an identification of criteria limiting what will be migrating in this effort, and (3) an effort can be scaled to allow more or less system resources for the effort to ensure the effort is completed in time. The tool submits jobs automatically to extract various system files from the application 110, that it then reads to determine the size of the migration effort (the number of reports or components to migrate). It is possible to migrate from applications other than EOS, in which case a user would have to supply similar extracts of the information to be migrated to the tool (manually), making sure it is in the expected format. Once the tool knows the number of reports or components to migrate, it calculates estimates of the length of time to perform the migration. It compares this estimate against the time goal provided by the user, and estimates the number of concurrent mainframe initiators that should be used. In the tool these are known as 'Sets'. Once the user determines the number of sets, this determination is used by the other migration tools to execute the migration process.

Figures 11C, 11D:
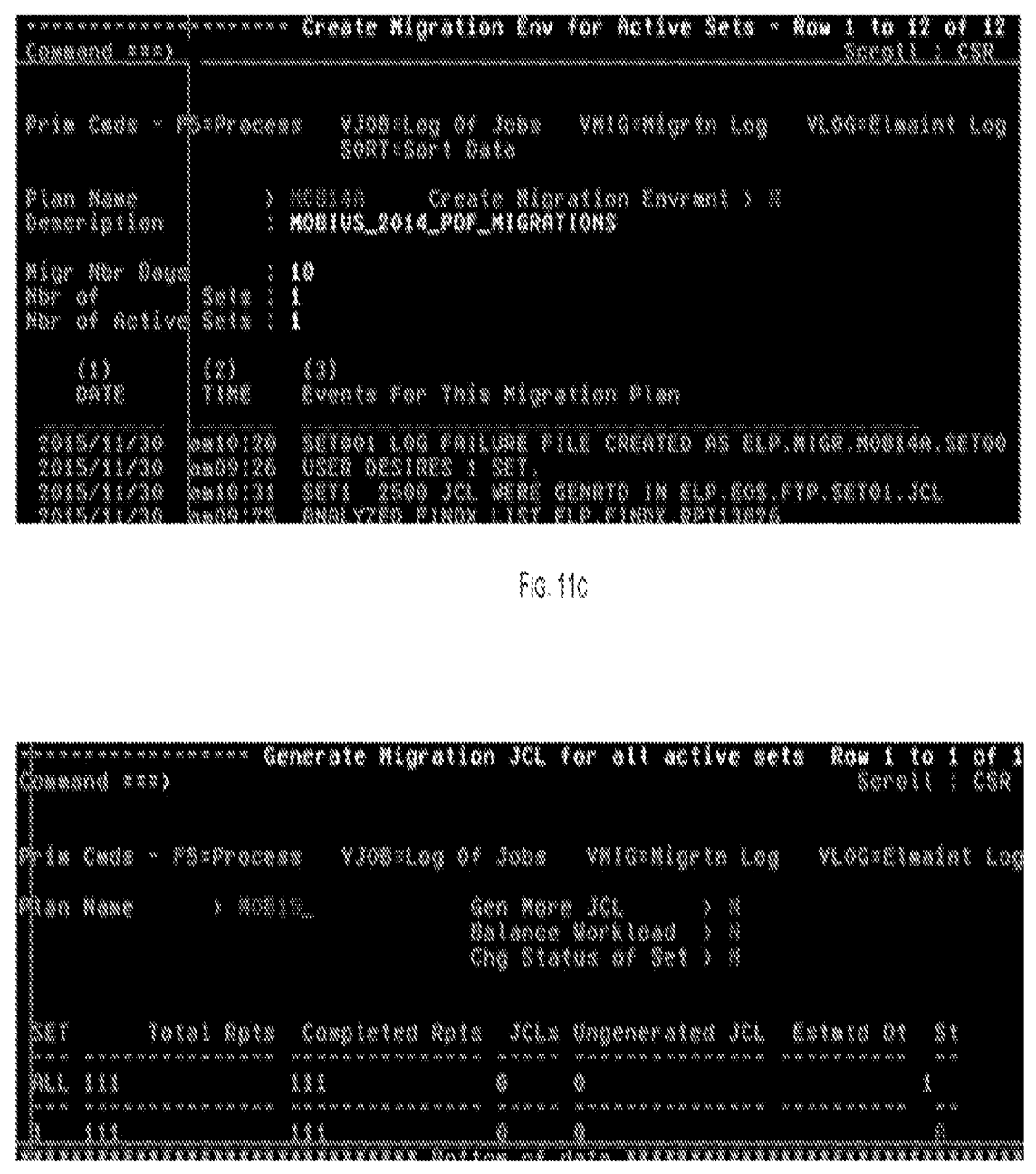

FIG. 11*c* shows a screenshot of a maintenance tool that is programmed to build all the datasets needed for the number of sets desired by the user for this migration effort. This tool has various features which enables various functions including (1) an ability to define and build many or all datasets and components that are required for a migration effort, (2) when building system components specific to a 'set', this interface allows a user to assign direct access storage device (DASD) pack to allocate thereto, and (3) extensive logging of actions performed, and jobs submitted to build an environment. (4) display at the bottom includes a log of all activities taken for this migration effort.

FIG. 11d shows a screenshot of a maintenance tool that is programmed to build all JCL for each report or component that needs to be migrated. This has various features which enables various functions including (1) reports progress of a migration effort to date, by set, (2) allows a user to activate or inactivate available sets, to change processing throughput, (3) generate a set of jobs, such as 2,500, per set at a sitting, for migrating components, and (4) estimates a time remaining in a migration effort.

Figures 11E, 11F:
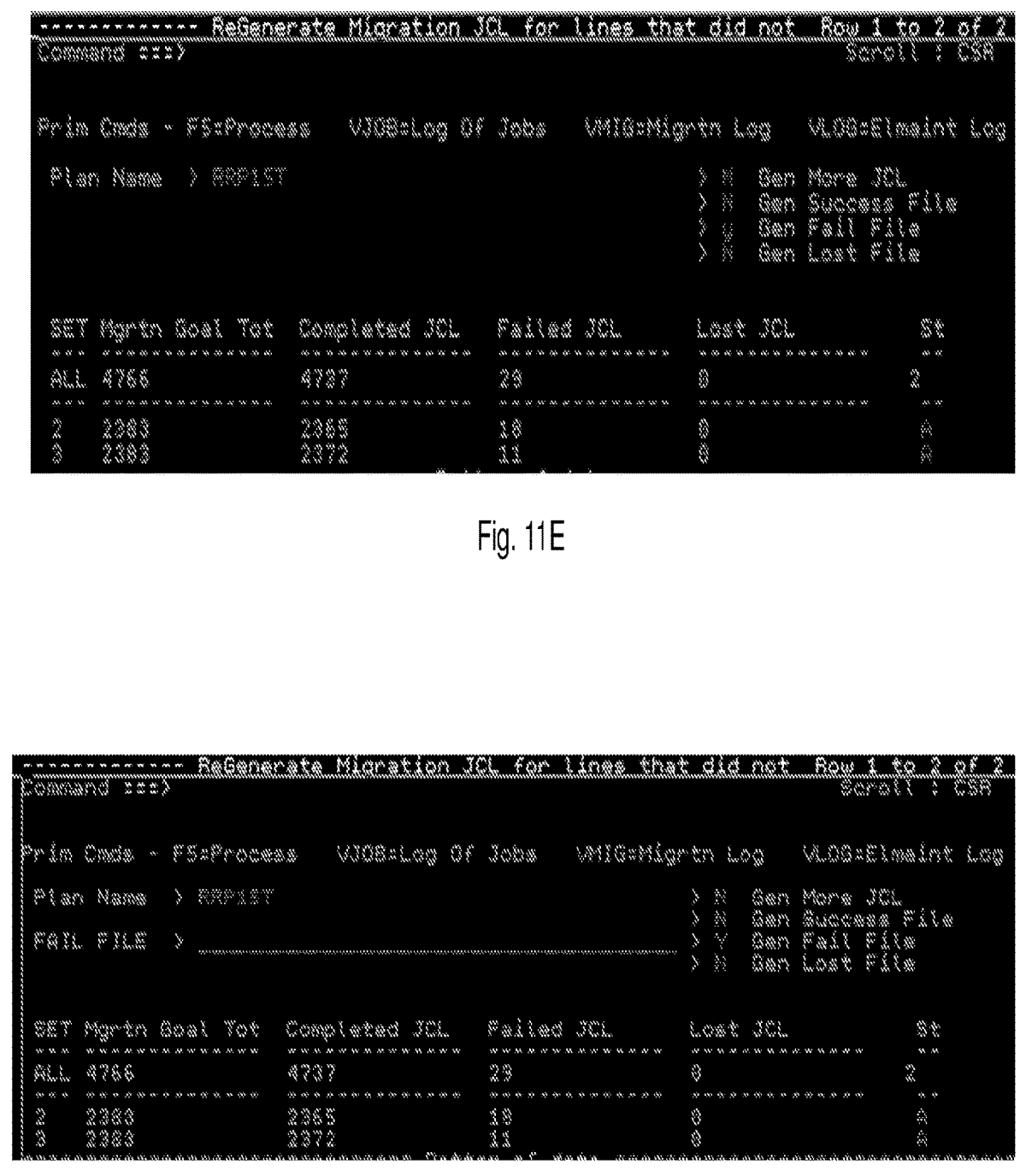

FIGS. 11e-11f show screenshots for the migration utility quality monitor component 236, as shown in FIG. 2c, that enables to display migration results and regenerate problematic JCL jobs. These are the report migrator component 214, as shown in FIG. 2a. The monitor component 236 is programmed to monitor and correct problems with a migration effort. This tool has various features which enable various functions including (1) viewing counts of the number of completed, failed, and lost jobs that have been run for each set in the current migration, (2) the capability to regenerate lost JCL jobs (3) the capability to generate lists of all successful or failed jobs in the migration, and (4) the capability to view various logs to investigate the cause of any job failures. Resultantly, this tool enables a user at any point of time during operation to know, such as via querying and receiving, how many jobs there were, how many have run, how many remain to be run, how many have failed, how many have succeeded and failed. For those jobs that failed, the tool is enabled to either edit and fix those jobs or resubmit those jobs just as they were (allows to do large amounts of work in a short amount of time and give users assurance that right work was actually done to restore these reports to provide more systematic control over quality versus manual).

As explained above, in some embodiments, a group of data governance users are able to have a security exit to limit a function that those users of EOS could do and then those users can control that security exit through various data entries in files. This security exit can be performed via allowing those users to control those files, without knowing that those users were actually controlling those files, while also keeping track of all the changes done by those users via a log of who changed, what, and when, which would not be able to be performed if those users were just directly manipulating those files. As such, the utility 112 allows those users to access a particular file that contains data, which informs the EOS of what functions to restrict for their particular subset of EOS. Subsequently, those users are able to control which functions those users want restricted via that particular file. Likewise, the utility logs, which log various user actions, including changes to files, enable the users to avoid particular knowledge about which format and code to use. Since the users are not subject to input of data in a wrong column or table, the utility 112 acts as an interface between the users and that particular file in order to avoid error and to keep a log of what was done, with the log operating as a control mechanism for access and a research tool when the users are figuring out why doesn't someone have access to export a particular report (the users can read the log to see whether a change was made for that particular report rather than just looking at a file that EOS makes a user enter).

Furthermore, in some embodiments, the EOS can have another user exit via a B-Date. For example, a user can submit a report today and that report contains only data for yesterday, so the report date is yesterday but the user is submitting the report today. EOS by itself would record that with a report date of today, but the B-date allows a user to define particular reports and then, where the date occurs on each page, the report can be parsed and EOS can fail. This can be acceptable based on the data the user received in this report rather than the report being today, the user would record the report as being a report from yesterday. This functionality is controlled by a file in EOS. FIG. 232 depicts an application within the utility 112 that enables an easy interface for updating the B-Date file. This application allows the user to make or change B-Date entries for any report. All changes made to the B-Date file by the application are logged for later research.

Various embodiments of the present disclosure may be implemented in a data processing system suitable for storing and/or executing program code that includes at least one processor, including a multicore processor, coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, "R" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

What is claimed is:

1. A method comprising:
    accessing, by a processor, a utility program hosted on an operating system of a mainframe, wherein the operating system hosts an application that includes a plurality of jobs, wherein the utility program includes a set of configuration metadata for the application;
    running, by the processor, the utility program such that the utility program receives a user input from a workstation that is in communication with the mainframe and such that the utility program interfaces with the application based on the set of configuration metadata responsive to the user input;
    modifying, by the processor, a job via the utility program interfacing with the application based on the set of configuration metadata responsive to the user input;
    submitting, by the processor, the job as modified to the application via the utility program interfacing with the application based on the set of configuration metadata responsive to the user input;
    querying, by the processor, the job at the application for a status via the utility program based on the set of configuration metadata; and
    notifying, by the processor, the workstation responsive to the status being indicative of a problem associated with the job.

2. The method of claim 1, wherein the problem includes an error and the method further comprises:
    triggering, by the processor, an alert based on the set of configuration metadata via the utility program responsive to the error; and
    outputting, by the processor, the alert to the workstation in communication with the utility program.

3. The method of claim 2, further comprising:
    generating, via the processor, a suggestion via the utility program based on the set of configuration metadata responsive to the error; and
    presenting, via the processor, the suggestion to the workstation via the utility program based on the set of configuration metadata.

4. The method of claim 3, wherein the alert and the suggestion are concurrently presented to the workstation via the utility program based on the set of configuration metadata.

5. The method of claim 1, wherein the utility program is programmed for calling a plurality of logical units to perform a plurality of functions with respect to the application, wherein at least one of the functions performs at least one of the modifying, the submitting, the querying, or the notifying.

6. The method of claim 1, wherein the utility program is programmed for a user access control via a plurality of user logins.

7. The method of claim 1, wherein the utility program is programmed to enable an addition of an app via modifying an entry of a file storing the set of configuration metadata.

8. The method of claim 7, wherein the app is programmed to read a log included in the utility program.

9. The method of claim 7, wherein the utility program determines its own level of security and prohibits a user without an appropriate credential from using the utility program.

10. The method of claim 1, further comprising:
    sending, by the processor, a suggestion to the workstation, wherein the suggestion relates to solving the problem.

11. A non-transitive storage device storing a plurality of instructions that are executable by a processor to cause the processor to:
    access a utility program hosted on an operating system of a mainframe, wherein the operating system hosts an application that includes a plurality of jobs, wherein the utility program includes a set of configuration metadata for the application;
    run the utility program such that the utility program receives a user input from a workstation that is in communication with the mainframe and such that the utility program interfaces with the application based on the set of configuration metadata responsive to the user input;

modify a job via the utility program interfacing with the application based on the set of configuration metadata responsive to the user input;

submit the job as modified to the application via the utility program interfacing with the application based on the set of configuration metadata responsive to the user input;

query the job at the application for a status via the utility program based on the set of configuration metadata; and notify the workstation responsive to the status being indicative of a problem associated with the job.

12. The non-transitive storage device of claim 11, wherein the problem includes an error, wherein request includes a trigger of an alert based on the set of configuration metadata via the utility program responsive to the error and an output of the alert to the workstation in communication with the utility program.

13. The non-transitive storage device of claim 12, wherein the instructions cause the processor to:

generate a suggestion via the utility program based on the set of configuration metadata responsive to the error; and present the suggestion to the workstation via the utility program based on the set of configuration metadata.

14. The non-transitive storage device of claim 13, wherein the alert and the suggestion are concurrently presented to the workstation via the utility program based on the set of configuration metadata.

15. The non-transitive storage device of claim 11, wherein the utility program is programmed for calling a plurality of logical units to perform a plurality of functions with respect to the application.

16. The non-transitive storage device of claim 11, wherein the utility program is programmed for a user access control via a plurality of user logins.

17. The non-transitive storage device of claim 11, wherein the utility program is programmed to enable an addition of an app via modifying an entry of a file storing the set of configuration metadata.

18. The non-transitive storage device of claim 17, wherein the app is programmed to read a log included in the utility program.

19. The non-transitive storage device of claim 17, wherein the utility program determines its own level of security and prohibits a user without an appropriate credential from using the utility program.

20. The non-transitive storage device of claim 11, wherein the instructions cause the processor to:

send a suggestion to the workstation, wherein the suggestion relates to solving the problem.

* * * * *